(12) United States Patent
Eto et al.

(10) Patent No.: US 10,192,315 B2
(45) Date of Patent: Jan. 29, 2019

(54) APPARATUS AND METHOD FOR HOLDING OBJECTS

(71) Applicant: Kabushiki Kaisha Toshiba, Minato-ku (JP)

(72) Inventors: Haruna Eto, Arakawa (JP); Takafumi Sonoura, Yokohama (JP); Hideichi Nakamoto, Setagaya (JP); Akihito Ogawa, Fujisawa (JP); Atsushi Sugahara, Kawasaki (JP); Junya Tanaka, Ota (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 152 days.

(21) Appl. No.: 15/439,535

(22) Filed: Feb. 22, 2017

(65) Prior Publication Data

US 2018/0040132 A1  Feb. 8, 2018

(30) Foreign Application Priority Data

Aug. 4, 2016  (JP) .................................. 2016-153858

(51) Int. Cl.
*G06T 7/13* (2017.01)
*B65G 47/91* (2006.01)
(Continued)

(52) U.S. Cl.
CPC ................ *G06T 7/13* (2017.01); *B65G 47/91* (2013.01); *B65G 59/04* (2013.01); *B65G 61/00* (2013.01);
(Continued)

(58) Field of Classification Search
USPC ........................................................ 700/213
See application file for complete search history.

(56) References Cited

U.S. PATENT DOCUMENTS 5,040,056 A * 8/1991 Sager ..................... B25J 9/0093
348/88
6,122,895 A * 9/2000 Schubert ................... B65B 5/12
53/240
(Continued)

FOREIGN PATENT DOCUMENTS

JP  4-286541  10/1992
JP  2001-317911  11/2001
(Continued)

*Primary Examiner* — Kyle O Logan
(74) *Attorney, Agent, or Firm* — Oblon, McClelland, Maier & Neustadt, L.L.P.

(57) ABSTRACT

According to one embodiment, an object holding apparatus includes a holding part, a recognition device, and a controller. The holding part is able to hold at least one object. The recognition device recognizes a plurality of objects to generate a recognition result. The controller selects a first object from the objects, based on the recognition result. The controller sets a first direction to one side of the first object along which the number of objects aligned with the first object is smaller than the number of objects aligned with the first object along the other side of the first object. The controller selects a second object aligned with the first object along the first direction. The controller controls a driving of the holding part, based on a selection result of the first object and the second object.

20 Claims, 14 Drawing Sheets

(FRONT VIEW)

(51) Int. Cl.
   *G06K 9/00* (2006.01)
   *B65G 59/04* (2006.01)
   *B65G 61/00* (2006.01)
   *G05B 19/418* (2006.01)

(52) U.S. Cl.
   CPC ..... *G05B 19/4189* (2013.01); *G06K 9/00664* (2013.01); *G05B 2219/31274* (2013.01); *G05B 2219/4706* (2013.01)

(56) References Cited

U.S. PATENT DOCUMENTS

| | | | | |
|---|---|---|---|---|
| 7,240,465 B2 * | 7/2007 | Davi' | ................. | B25J 9/1697 198/437 |
| 7,654,380 B2 * | 2/2010 | Nishihara | ............ | B25J 9/0093 198/349 |
| 8,805,585 B2 * | 8/2014 | Nishihara | ............ | B25J 9/0093 198/339.1 |
| 2007/0179671 A1 * | 8/2007 | Arimatsu | ......... | G05B 19/4182 700/247 |
| 2010/0008754 A1 * | 1/2010 | Hartmann | .......... | G05B 19/4103 414/800 |
| 2015/0066199 A1 * | 3/2015 | Shimono | ................ | B65G 59/04 700/218 |
| 2016/0016311 A1 * | 1/2016 | Konolige | ................ | B25J 5/007 700/245 |
| 2016/0207072 A1 * | 7/2016 | Hellenbrand | ........... | B07C 5/362 |

FOREIGN PATENT DOCUMENTS

| | | |
|---|---|---|
| JP | 2015-47681 | 3/2015 |
| JP | 2015-193468 | 11/2015 |
| JP | 2015-217790 | 12/2015 |
| JP | 2015-223266 | 12/2015 |

* cited by examiner (TOP VIEW)

(FRONT VIEW)

|  | (THE NEMBER OF ALL OBJECTS) / (THE NUMBER OF TIMES OF HOLDING OPERATION) | | | | |
|---|---|---|---|---|---|
|  | CONVENTIONAL METHOD 1 | CONVENTIONAL METHOD 2 | CONVENTIONAL METHOD 3 | CONVENTIONAL METHOD 4 | THIRD METHOD |
| SAMPLE 1 (ALIGNMENT) | 1.81 | 1.81 | 1.81 | 1.36 | 1.81 |
| SAMPLE 2 (ALIGNMENT) | 2 | 2 | 2 | 1.33 | 2 |
| SAMPLE 3 (ALIGNMENT) | 1.5 | 1.5 | 1.5 | 1.5 | 1.5 |
| SAMPLE 4 (ALIGNMENT) | 1.8 | 1.8 | 1.8 | 1.38 | 1.8 |
| SAMPLE 5 (RANDOM) | 1.36 | 1.21 | 1.21 | 1.21 | 1.36 |
| SAMPLE 6 (RANDOM) | 1.52 | 1.47 | 1.47 | 1.43 | 1.52 |
| SAMPLE 7 (RANDOM) | 1.89 | 1.96 | 1.96 | 1.89 | 1.96 |
| SAMPLE 8 (RANDOM) | 1.31 | 1.17 | 1.17 | 1.17 | 1.31 |
| SAMPLE 9 (RANDOM) | 1.52 | 1.47 | 1.43 | 1.39 | 1.52 |
| AVE | 1.63 | 1.60 | 1.59 | 1.41 | 1.64 |

APPARATUS AND METHOD FOR HOLDING OBJECTS

CROSS-REFERENCE TO RELATED APPLICATION

This application is based upon and claims the benefit of priority from Japanese Patent Application No. 2016-153858, filed on Aug. 4, 2016; the entire contents of which are incorporated herein by reference.

FIELD

Embodiments described herein relate generally to an apparatus and a method for holding objects.

BACKGROUND

Usually, as to automation of transportation working in a factory or warehouse, in order to quickly perform the processing, a size of object, a loading status of object, or a location information of object, are previously registered into a transportation control apparatus. However, in order to process various loaded objects using this technique, a large number of assumed objects need to be previously registered, and the registration working takes a long time. Furthermore, the number of data is enormous, and many times are required for the entire processing. As a result, the processing efficiency is poor. Furthermore, the object is recognized by a camera and processed. Accordingly, sufficient time is necessary to recognize one object, and this technique is unsuitable for processing of various loaded objects.

Moreover, as a conventional method, by using information such as a size of object or a loading status of object (previously stored into the transportation control apparatus), a hypothesis of algorithm processing steps for holding and transportation is created, and the most effective algorithm processing steps are selected. However, in consideration of a practical spot where various objects are processed, if the stringency is more pursued, the calculation resource is more enormous. Furthermore, if the easiness of enforcement is more pursued, the benefit of algorithm is harder to be accepted.

DETAILED DESCRIPTION

Figure 1A:
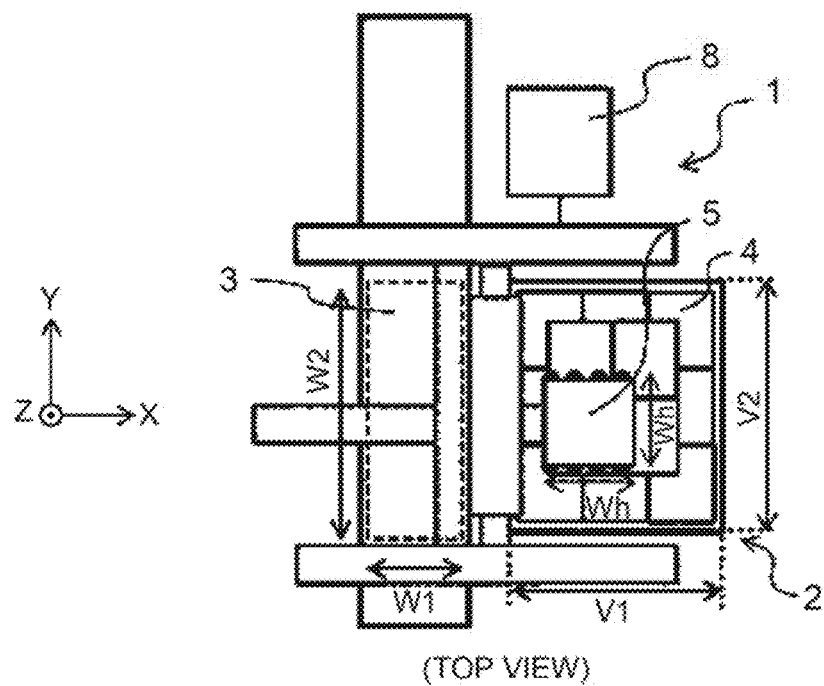
FIGS. 1A and 1B are schematic diagrams showing a front view and a top view of one example of an object holding apparatus according to the first embodiment.

According to one embodiment, an object holding apparatus includes a holding part, a recognition device, and a controller. The holding part is able to hold at least one object. The recognition device recognizes a plurality of objects to generate a recognition result. The controller selects a first object from the objects, based on the recognition result. The controller sets a first direction to one side of the first object along which the number of objects aligned with the first object is smaller than the number of objects aligned with the first object along the other side of the first object. The controller selects a second object aligned with the first object along the first direction. The controller controls a driving of the holding part, based on a selection result of the first object and the second object.

Hereinafter, an object holding apparatus according to various embodiments will be described with reference to the accompanying drawings. Parts having same sign are the same part respectively. Moreover, the drawings are schematic or conceptual ones. In the drawings, a relationship between a thickness and a width of each part, and a relative dimension of a size between each part, are not always equal to actual ones. Furthermore, even if the drawings show the same part, in some cases, mutual measurements and relative dimensions of the same part are shown differently by the respective drawings.

The First Embodiment

Figure 1B:
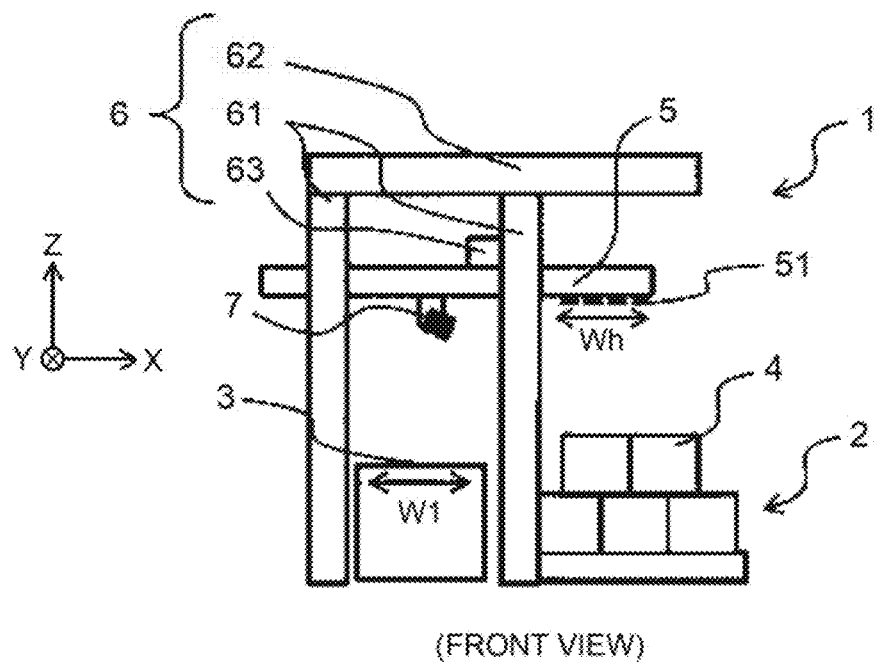

The first embodiment is explained by referring to FIGS. 1A and 1B. FIGS. 1A and 1B are schematic diagrams showing a front view and a top view of one example of an object holding apparatus according to the first embodiment.

As shown in FIGS. 1A and 1B, on a loading region 2, a plurality of objects 4 having various shapes are loaded.

An object holding apparatus 1 and a transportation region 3 are fixed on the ground. The object holding apparatus 1 selectively picks the objects 4 from the loading region 2, and transfers them to the transportation region 3. The object holding apparatus 1 may be movable. For example, the object holding apparatus 1 can equip a roller at the bottom part. Alternatively, the object holding apparatus 1 can move along a rail.

The loading region 2 may be a packet, a basket carriage, or a box pallet to load the object 4. The loading region 2 may be movable by a roller installed onto the bottom part, or may be fixed. An object loaded into the loading region 2 may be called "a loaded object".

The transportation region 3 transports the object 4 transferred by the object holding apparatus 1. For example, it may be a belt conveyor, a pallet, or a workbench. For example, a width of the transportation region 3 along x-axis direction is W1, and a width of the transportation region 3 along y-axis direction is W2.

As shown in FIG. 1, the object holding apparatus 1 includes a holding part 5, a driving part 6, a recognition device 7, and a controller 8. The holding part 5 can move the object (to transfer from the loading region 2 to the transportation region 3) with holding. The driving part 6 drives the holding part 5. The recognition device 7 recognizes a shape of the object (existing on the loading region 2) from an image thereof. The controller controls an operation of the holding part 5 by driving the driving part 6.

The holding part 5 is connected to the driving part 6 and movable along three-axes directions. Specifically, the driving part 6 drives the holding part 5 along a vertical direction, a front-back direction, and a lateral direction. In order to explain, as shown in FIGS. 1A and 1B, an orthogonal coordinate axis is set. Z-axis corresponds to a vertical direction, x-axis corresponds to a front-back direction, and y-axis corresponds to a lateral direction. The front-back direction and the lateral direction are in parallel with a horizontal direction, i.e., a horizontal plane where the object holding apparatus 1 is installed. The horizontal direction is in parallel with a bottom face of a holding target object. The holding part 5 is installed so as to face a top face of the object 4 loaded on the loading region 2. For example, the holding part 5 equips a plurality of suckers connected to a vacuum pomp (not shown in FIGS. 1A and 1B), and holds the object 4 by suction. The sucker 51 is installed on a lower face of the holding part 5. Concretely, the driving part 6 includes support parts 61, 62 and 63. The support part 61 drives the holding part 5 along z-direction. The support part 62 drives the holding part 5 along x-direction. The support part 63 drives the holding part 5 along y-direction.

A width Wh of the holding part 5 along x-direction may be over a width V1 of the loading region 2 along x-direction at most. However, a maximum width of objects simultaneously holdable by one stroke is limited within a width W1 of the transportation region 3 (transportation destination). As to y-axis direction, this limitation is similarly applied.

As to the holding part 5 and the driving part 6, above-mentioned component is one example. For example, a method for the holding part 5 to hold the object 4 may be clamping.

On the holding part 5, the recognition device 7 is installed. The recognition device 7 acquires an image which puts the loaded object 7 in a visual field from the horizontal direction or oblique direction. Namely, the recognition device 7 generates the image by regarding a location of the object 4 (loaded on the loading region 2) as a recognition result. As the recognition device 7, for example, a camera able to measure a three-dimensional position (such as an infrared dot pattern projection camera) can be utilized. Hereinafter, the recognition device 7 is explained as the infrared dot pattern projection camera. The infrared dot pattern projection camera projects an infrared dot pattern onto a target object, and photographs an infrared image of the target object under this condition. By analyzing the infrared image, three-dimensional information of the target object can be acquired. The infrared dot pattern projection camera may photograph a color image or a monochrome image. Alternatively, except for the infrared dot pattern projection camera, the recognition device 7 may include an optical sensor such as a camera to capture a color image or a monochrome image. Furthermore, the recognition device 7 may include a plurality of cameras. By locating the plurality of cameras at another position, for example, a shape of the object along a depth direction can be recognized with high accuracy. The above-mentioned image is, for example, image data generally used such as jpg, gif, png, bmp, and so on. Moreover, the recognition device 7 may be installed at a place except for the holding part 5. For example, the recognition device 7 may be installed onto the driving part 6.

The recognition device 7 is installed onto the holding part 5 and movable with the holding part 5. Accordingly, the recognition device 7 can recognize a wide area. In case of recognition, for example, the recognition device 7 is driven at a position where the highest part of loaded objects is a little lower than the upper limit of the recognition area.

The controller 8 accepts an image as the recognition result from the recognition device 7, and determines a moving target position of the holding part 5 and the driving part 6.

First, based on the image accepted, the controller 8 calculates a position of an object (it is called "a first object" or "a base object") located at the highest position among loaded objects. Continually, based on the image accepted, the controller 8 calculates a position of an object (it is called "a second object") located at the second highest position (next to the first object) among loaded objects. In the first embodiment, a position of the object calculated by the controller 8 is a position of a corner (edge) formed by a top face and a front face (or a side face) of the object. The front face represents a side face of the object at the side facing the object holding apparatus 1. An edge formed by the top face and the front face of the first object is called "a first edge", and an edge formed by the top face and the front face of the second object is called "a second edge". The controller 8 detects the first edge and the second edge from the image accepted from the recognition device 7. The first edge is a corner of the object located at the highest position among loaded objects. If a plurality of objects is located at the highest position, the first edge is a corner of an object located at the nearest position to the object holding apparatus 1 among the plurality of objects. The second edge is a corner of another object located at the second highest position (next to the first edge) and at the nearest position to the object holding apparatus 1.

As a method for detecting the first edge and the second edge, for example, if the recognition device 7 is a three-dimensional sensor, by converting data (acquired by the recognition device 7) to point group data in a three-dimensional space, the edge can be calculated. In order to acquire the first edge, from the point group data (acquired by conversion), a point group having the largest z-value (i.e., located at the highest position) and composed by a plurality of points mutually adjacent, is specified. By rearranging the point group in order of y-value, a point group having the smallest x-value in an arbitrary range of y-value is extracted as the first edge. The second edge is calculated in the same way as the method for calculating the first edge. However, the second edge is selected from a point group different from a point group corresponding to the first edge. Alternatively, at a region adjacent to the first edge, a horizontal line detected by image processing may be the second edge. In this method, the first edge and the second edge can be certainly detected with few calculation loads. This detection of the first edge and the second edge may be performed by the recognition device 7. Furthermore, detection of edge is not limited to the first edge and the second edge. Edges of objects located at different heights (except for the first edge and the second edge) can be detected.

Next, an algorithm for the controller 8 to operate the holding part 5 and the driving part 6 is explained in detail.

In order to effectively transport objects (loaded randomly) in consideration of limitation of the transportation region, the controller 8 controls the holding part 5 and the driving part 6 based on a simple algorithm. For example, the controller 8 can be mounted by a computer (equipping a processor and a memory) or LSI (large scale integration).

Figure 2A:
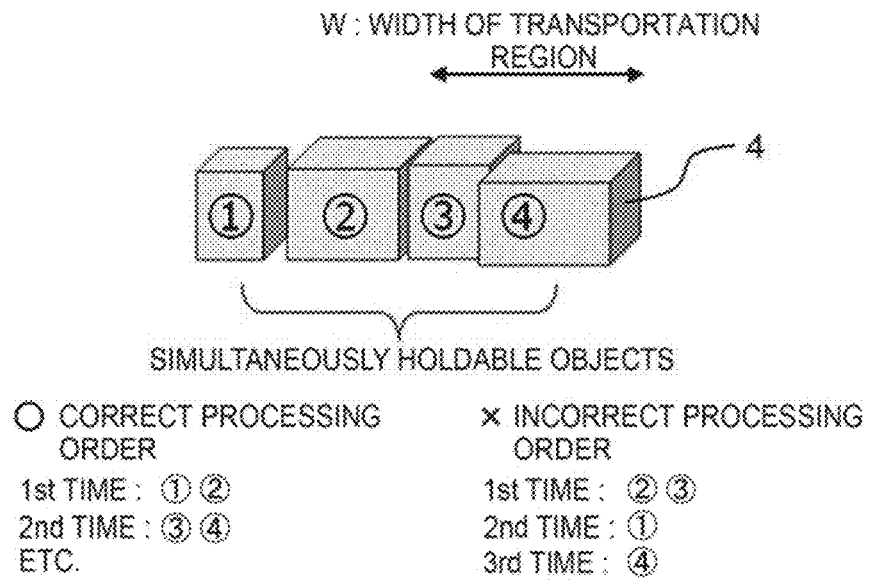
FIGS. 2A and 2B are schematic diagrams showing laterally-arranged four objects having numbers, a width W of a transportation region, and one example of avoidance operation for a basket frame.

FIG. 2A shows laterally-arranged four objects having numbers of loading regions, and a width W of the transportation region.

As shown in FIG. 2A, if four objects are laterally arranged along x-axis direction, two or more objects cannot be held and transported due to a limitation of the transportation region W. In this case, if two objects located at a center position are processed at once, in order to process these four objects, three strokes are necessary in total. In general, steps to process two objects at both sides are thought about. In order to perform these steps, an object number is assigned in order based on the transportation region W, and a holding target is determined by prioritizing in order to smaller number. In FIG. 2A, a simple decision whether to prioritize the left side or the right side is only necessary.

However, if respective shapes of objects (loaded randomly) are different, even if above-mentioned simple decision is applied, a pattern unable to be effectively transport exists.

Figure 2B:
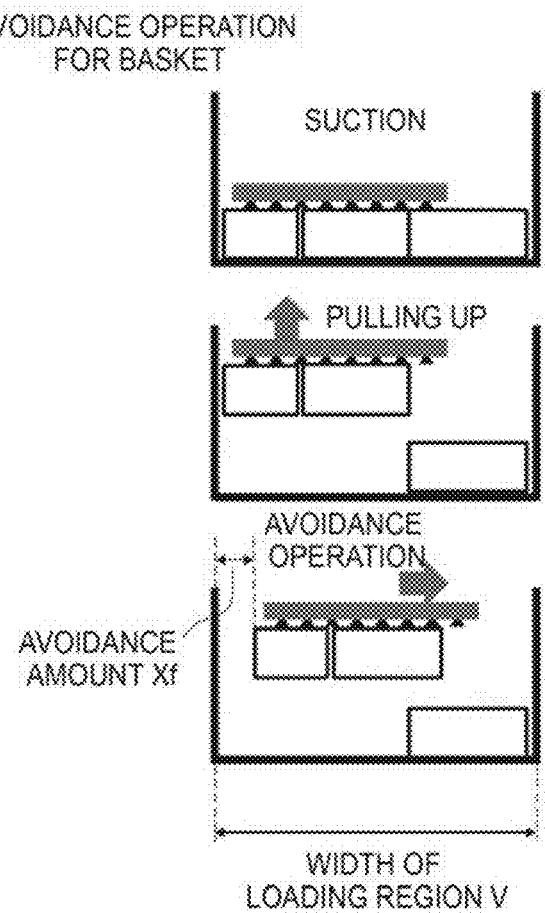

Here, a maximum width of objects (holding targets) to be simultaneously held by one stroke of the holding part is explained. For example, if a loading region has a basket shape, even if all objects densely spread all over the loading region are held and transferred simultaneously, there is a risk that the objects are caught by a basket frame along x-axis direction. Accordingly, if there is a possibility that the objects contact with the basket frame, the holding part operates so as to avoid the basket frame. FIG. 2B is a schematic diagrams showing one example of avoidance operation for the basket frame. When an object (holding target) is detected at a corner of the loading region, the object is transferred so as to avoid the basket frame for safety. In consideration of an avoidance amount Xf at this timing, a width of holding objects is limited to be below a value that the avoidance amount Xf is subtracted from a width V of the loading region.

Furthermore, if the loading region is flat stacking-type (without the basket frame), or if the transportation region is narrow, the width of holding objects has the similar limitation. An area of objects simultaneously transportable is limited by the transportation region, next to whether the holding can be executed. In the first embodiment, an area (or a width) limited in this way is set to a transportation region W (or a transportation width W), and a plurality of objects accommodated into this area (or width) is set to holding targets.

Figure 3:
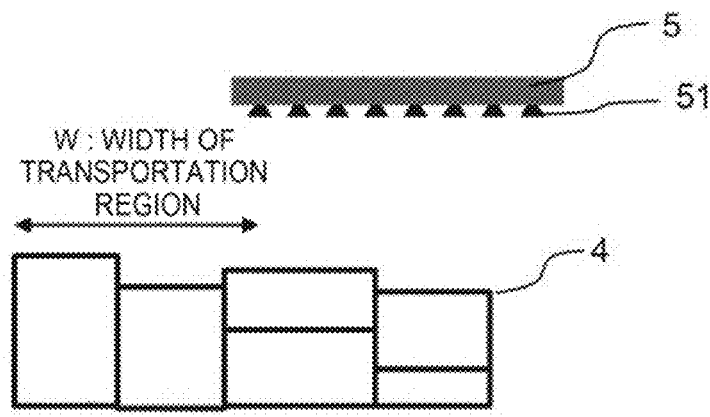
FIG. 3 is a schematic diagram showing a plurality of loaded objects having different sizes, and a width W of a transportation region.

FIG. 3 is a schematic diagram showing a plurality of loaded objects having different sizes, and a width W of the transportation region.

Figure 4:
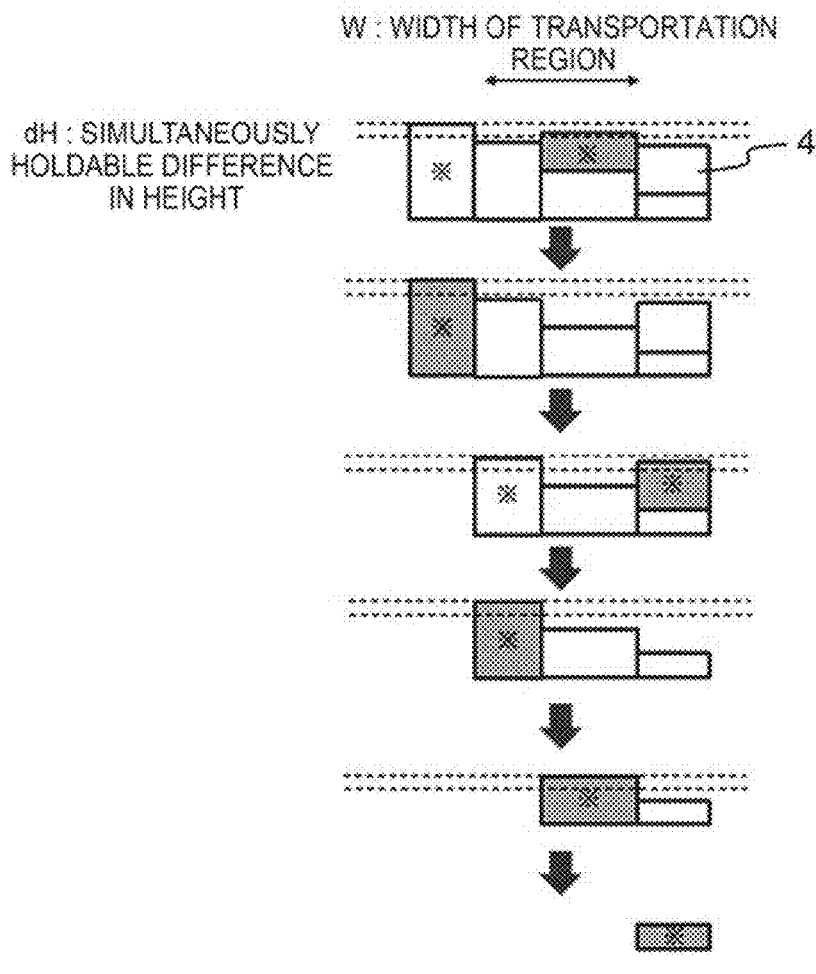
FIG. 4 is a schematic diagram showing the number of processing times in case of processing holdable objects in order from the right side.
Figure 5:
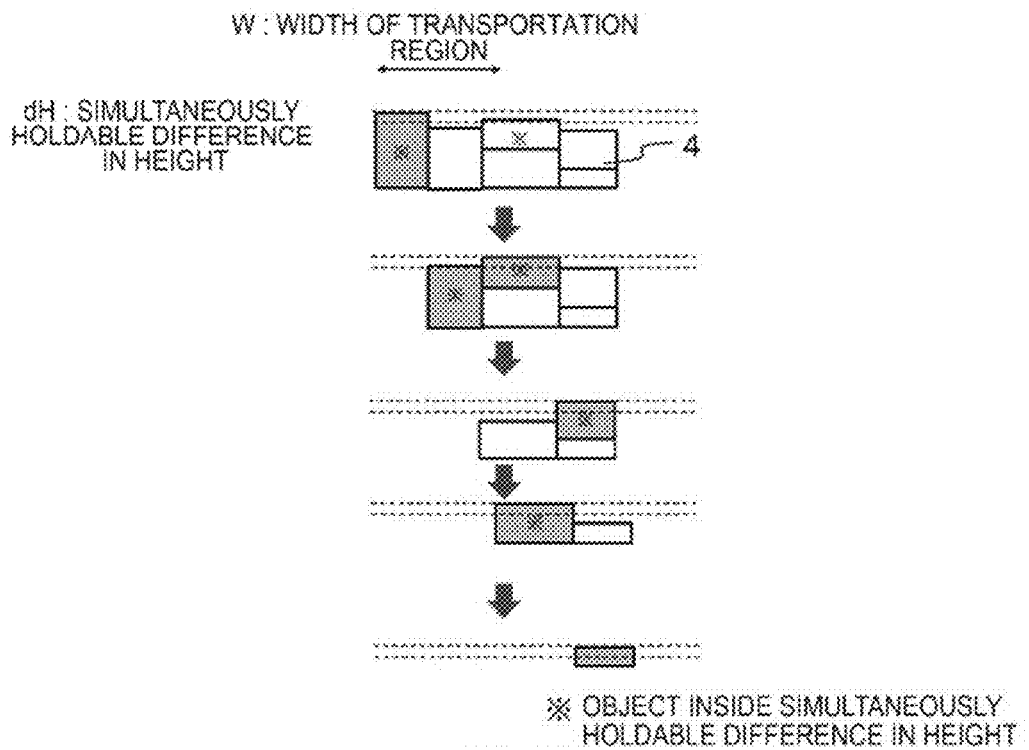
FIG. 5 is a schematic diagram showing the number of processing times in case of processing holdable objects in order from the left side.

As shown in FIG. 3, when a plurality of objects having different sizes is loaded, if a difference in height among the objects is within some range, these objects are holding targets to be transferred simultaneously. However, it a difference in height among the objects is over some range, these objects are not holding targets to be transferred simultaneously. In this case, by applying a simple rule, if holdable objects are processed in order from the right side, as shown in FIG. 4, six times-processing is necessary. If holdable objects are processed in order from the left side, as shown in FIG. 5, only five times-processing is necessary. In case of FIG. 5, by processing in order from the left side, the objects are held in higher order from an object located at the highest position. As a result, this is effective processing order.

Namely, even if objects are loaded randomly, the objects are processed in higher order from an object loaded at the highest position. This is the most safe and effective transportation operation.

In the first embodiment, from all objects existing within a simultaneously holdable difference in height dH, objects (holding targets) are selected based on a limitation of the transportation region N. In this case, the controller controls to select an object located at the highest position as a base object, and to hold the selected object (base object). A difference in height between the object located at the highest position and another object located at the second highest position is calculated as a difference between the first edge and the second edge. If the difference is smaller than (or equal to) dH, these objects can be held simultaneously. If the difference is larger than dl, these objects cannot be held simultaneously. For example, among the first object~the N-th object located in order of higher position, if a difference in height between the first edge (of the first object) and the N-th edge (of the N-th object) is within dH, all of the first object~the N-th object are holding targets able to be held simultaneously.

Figure 6:
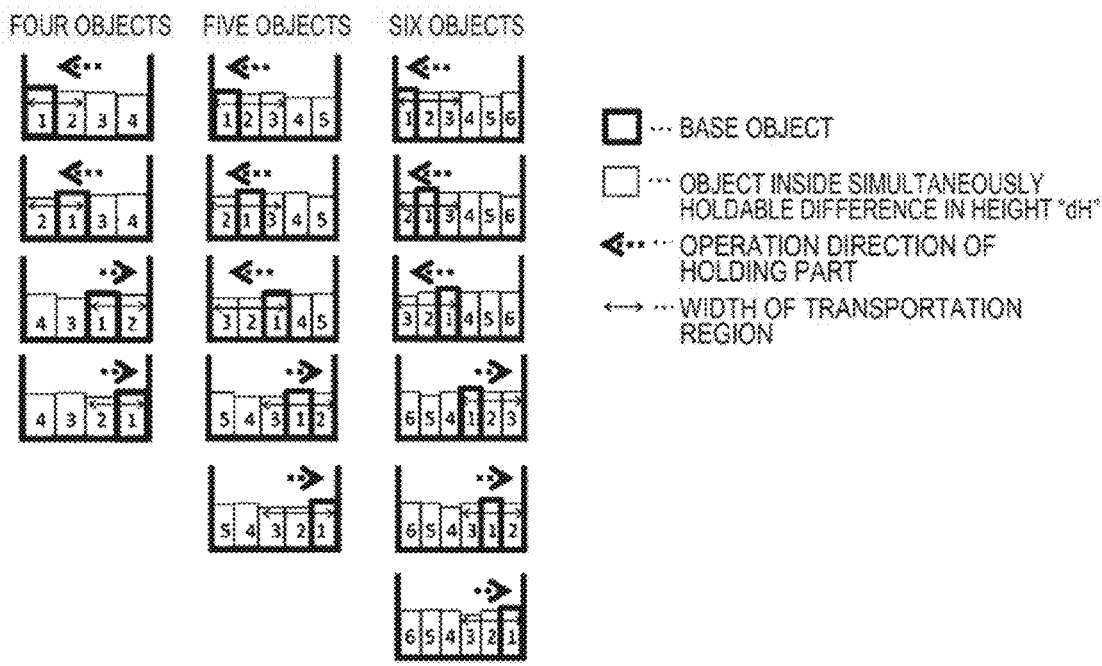
FIG. 6 is a schematic diagram showing one example of holding target objects of which priority orders are numbered when four~six objects exist within a difference in height dB.

FIG. 6 is a schematic diagram showing one example of holding target objects of which priority orders are numbered when four~six objects exist within a difference in height dH. Here, in order to simplify, objects one-dimensionally aligned is explained.

First, an object located at the highest position is set to a number one (base object). Next, objects located within a simultaneously holdable difference in height dH from the base object are numbered in order. Among objects having smaller numbers, objects accommodated into the transportation region are selected as holding target objects.

When numbers are assigned to objects located within the simultaneously holdable difference in height dl, objects adjacent to the base object are preferentially numbered. For example, as to objects aligned at one side of the base object along which the number of objects adjacent to the base object is smaller, the objects are numbered in order of nearer to the base object. If the holding part is positioned at a center of the loading region, an operation direction of the holding part is an arrow direction in FIG. 6.

As a method for assigning object numbers representing an order of holding targets, a first method for setting the number of objects around the base object to a reference, and a second method for setting a clearance of a position of the base object from a center of the loading region (a width from a center of the base object to an and (end part) of the loading region) to a reference, are applied.

Figure 7:
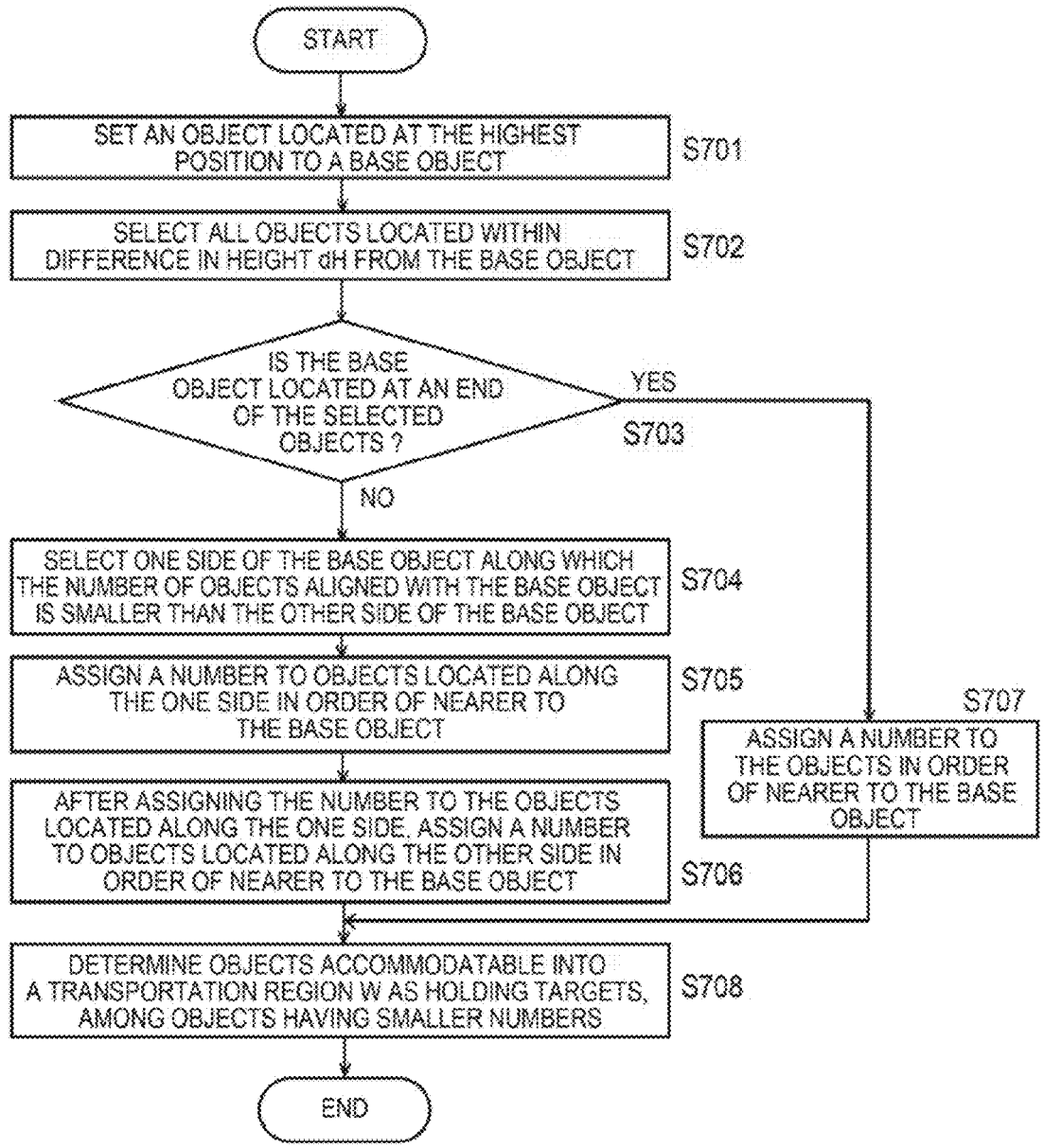
FIG. 7 is a flow chart of processing of a first method to decide using the number of objects around a base object.

FIG. 7 is a flow chart of processing of the first method for deciding by the number of objects around the base object. First, an object located at the highest position is set to a base object (S701). All objects located within a difference in height dB from the base object are selected (S702). It is confirmed whether the base object is located at an end of the selected objects (S703). In case of "No", the number of objects aligned at the right side of the base object is compared with the number of objects aligned at the left side of the base object. From the right side and the left side, one side along which the number of objects is smaller is selected (S704). As to objects aligned at the one side along which the number of objects is smaller, the objects are numbered in order of nearer to the base object (S705). After completing numbering of the objects, as to objects aligned at another side along which the number of objects is larger, the objects are numbered in order of nearer to the base object (S706). In case of "Yes", objects are numbered in order of nearer to the base object (S707). Last, among objects having smaller numbers, objects accommodated into a width W of the transportation region are determined as holding targets (S708). The objects of holding targets are held by the holding part and transferred to the transportation region. In this way, by assigning respective numbers to all objects (transportation targets) in order to holding target, an object located at the highest position is always set to the holding target. As a result, occurrence of steps having poor efficiency cannot be prevented.

Figure 8:
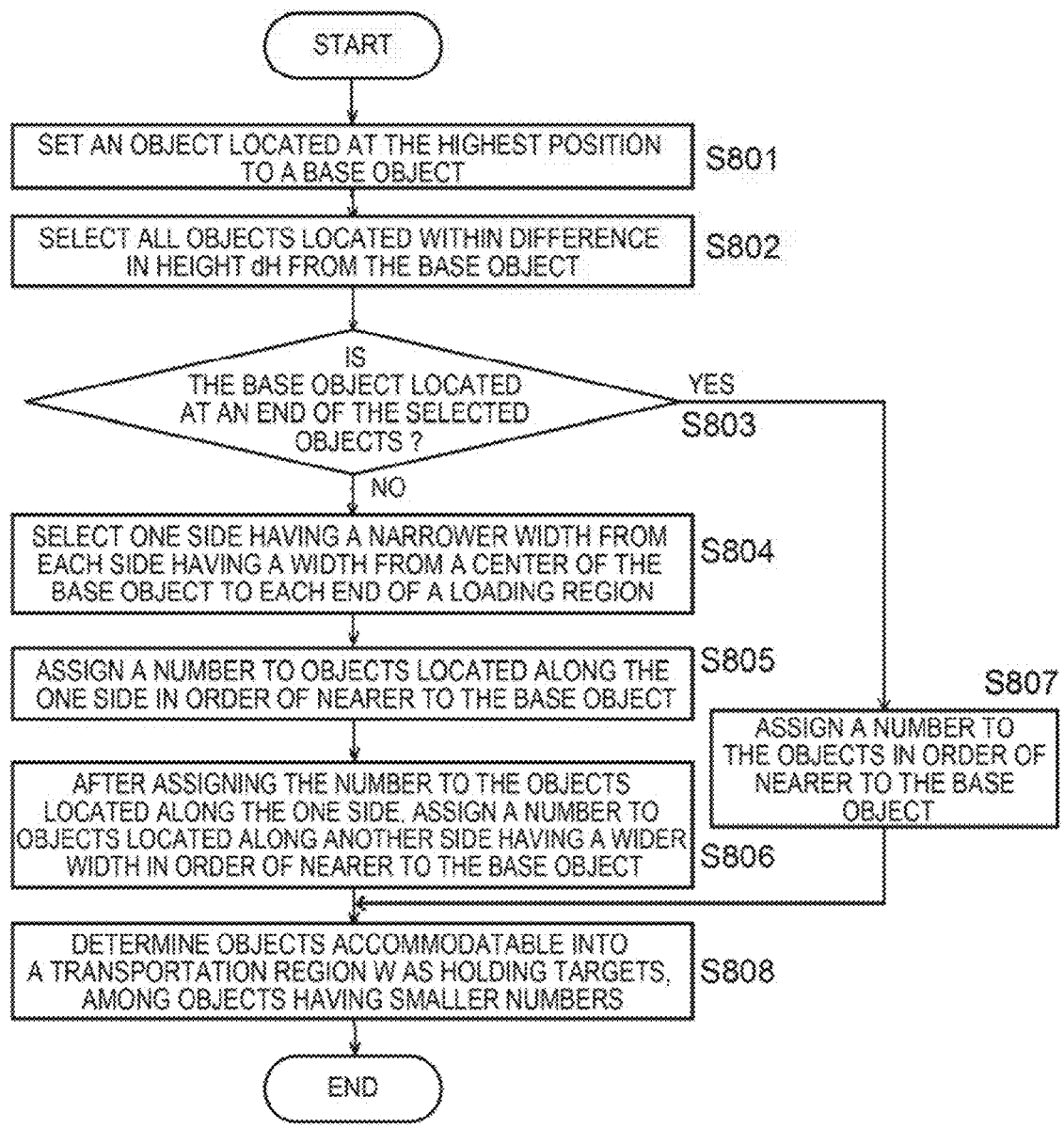
FIG. 8 is a flow chart of processing of a second method to decide using a clearance (width from a center of the base object to an end of a loading region) of a position of the base object.

FIG. 8 is a flow chart of processing of the second method for deciding by a clearance of a position of the base object from a center of the loading region (a width from a center of the base object to an end (end part) of the loading region). In the first method, by comparing the respective numbers of objects aligned at right and left sides of the base object, a direction to assign numbers in order of holding targets is decided. However, in the second method, among widths (distances) from a center of the base object to an end of the loading region, objects aligned at one side having a narrower width are preferentially numbered in order of holding targets. First, an object located at the highest position is set to a first number (a base object) (S801). All objects located within a difference in height dH from the base object are selected (S802). It is confirmed whether the base object is located at an end of the selected objects (S803). In case of "No", among respective widths from a center of the base object to each end (each end part) of the loading region, one side (of the base object) having a narrower width is selected (S804). As to objects aligned at the one side having the narrower width, the objects are numbered in order of nearer to the base object (S805). After completing numbering of the objects, as to objects aligned at another side (of the base object) having a wider width, the objects are numbered in order of nearer to the base object (S806). In case of "Yes", objects are numbered in order of nearer to the base object (S807). Among objects having smaller numbers, objects accommodated into a width W of the transportation region are determined as holding targets (S808). The objects of holding targets are held by the holding part and transferred to the transportation region. In the flow chart of FIG. 8, this method is effective for the case that many small objects are loaded. Furthermore, in above-mentioned method, numbers are assigned based on a distance from a center of the base object to an end of the loading region. However, among objects located within a difference in height dH from the base object, numbers may be assigned based on a distance from a center of the base object to an end of objects located within a difference in height dH. For example, among objects having a narrower width from a center of the base object to an and of each of the objects (located within a difference in height dH), the objects are numbered in order of nearer to the base object. After that, among objects having a wider width from a center of the base object to an end of each of the objects (located within a difference in height dH), the objects are numbered in order of nearer to the base object.

In the first method, among objects having smaller numbers, objects accommodated into a width W of the transportation region is set to holding targets. However, as to objects aligned at one side of the base object along which the number of objects aligned with the base object is smaller, if an object to be numbered next to the base object is far away from the base object over a width W of the transportation region, this object is deleted from the holding target. In this case, objects aligned at another side of the base object along which the number of objects aligned with the base object is larger are preferably set to target objects.

Based on the first method or the second method, the holding part 5 sets an object located at the highest position to a base object. Among objects located around the base object, the holding part 5 operates to drive along a direction of the side having the smaller number of objects aligned with the base object or a direction of the side having a narrower width from a center of the base object to an end of the loading region. As a result, many objects are not always held. Only objects accommodatable into the transportation region are held.

In above-mentioned explanation, by viewing objects from a front face of the loading region (x-axis direction in FIG. 1), processing effective for the case that objects are aligned along a single line (y-axis condition in FIG. 1) was explained. However, this method is not limited to the case that objects are aligned along a single line. This method can be applied to the case that objects are aligned along a depth direction.

Figure 9:
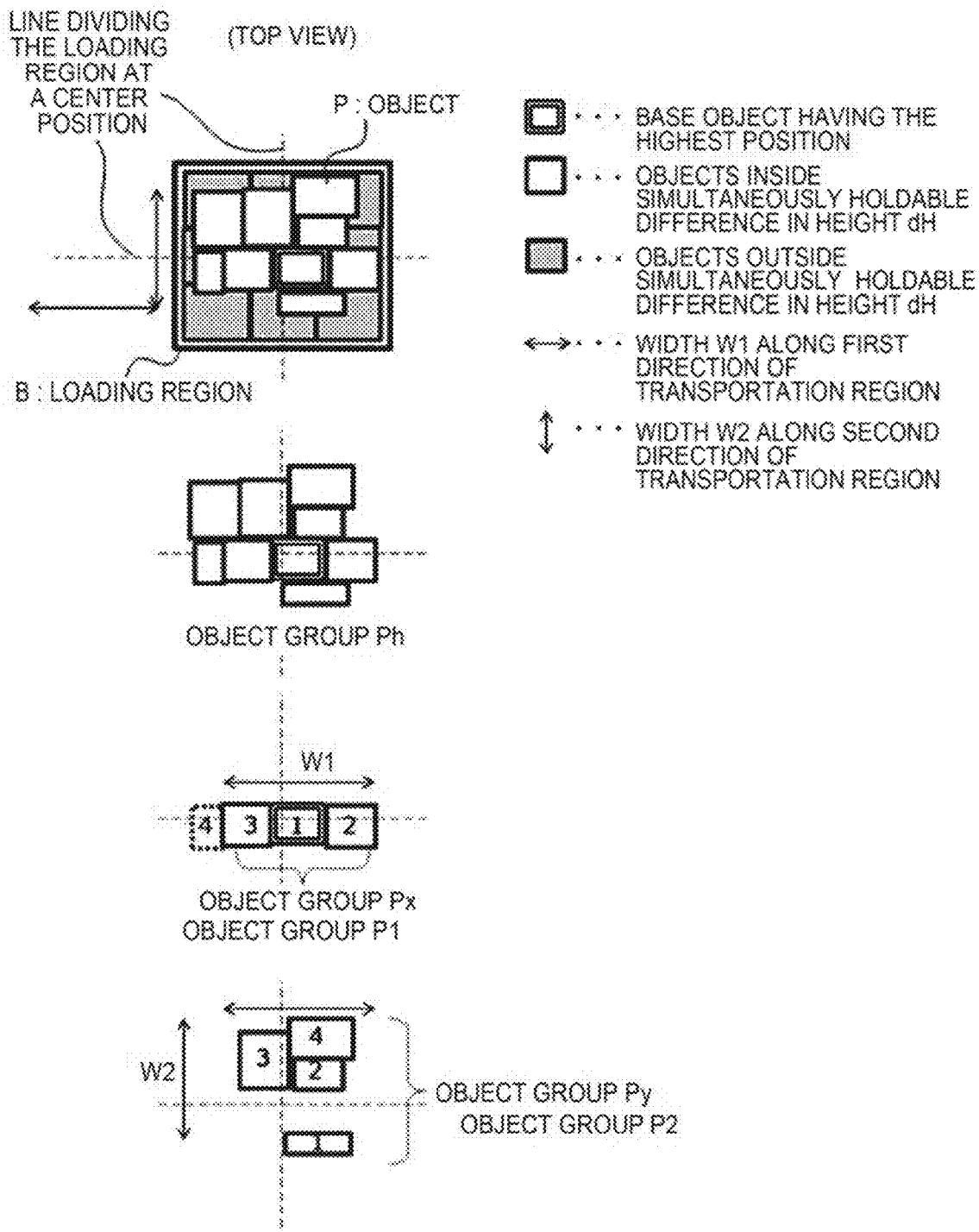
FIG. 9 is a schematic diagram of loaded objects in case of viewing the loading region from a top face direction.

FIG. 9 is a schematic diagram of loaded objects in case of viewing the loading region from a top face direction.

As shown in FIG. 9, in case of viewing the loading region from a top face side, after detecting the base object located at the highest position, suppose that a plurality of objects located within a simultaneously holdable difference in height dB from the base object is detected. Furthermore, an area of the transportation region is W1×W2. If the holding part is large, the holding part can hold not only objects aligned along a first direction but also objects aligned along a second direction perpendicular to the first direction. If the holding part is sufficiently large as a planar shape including the first direction and the second direction, the holding part can effectively hold and transport a plurality of objects. For example, the first direction is in parallel with one side W1 of the transportation region, and the second direction is in parallel with the other side W2 of the transportation region.

Figure 10:
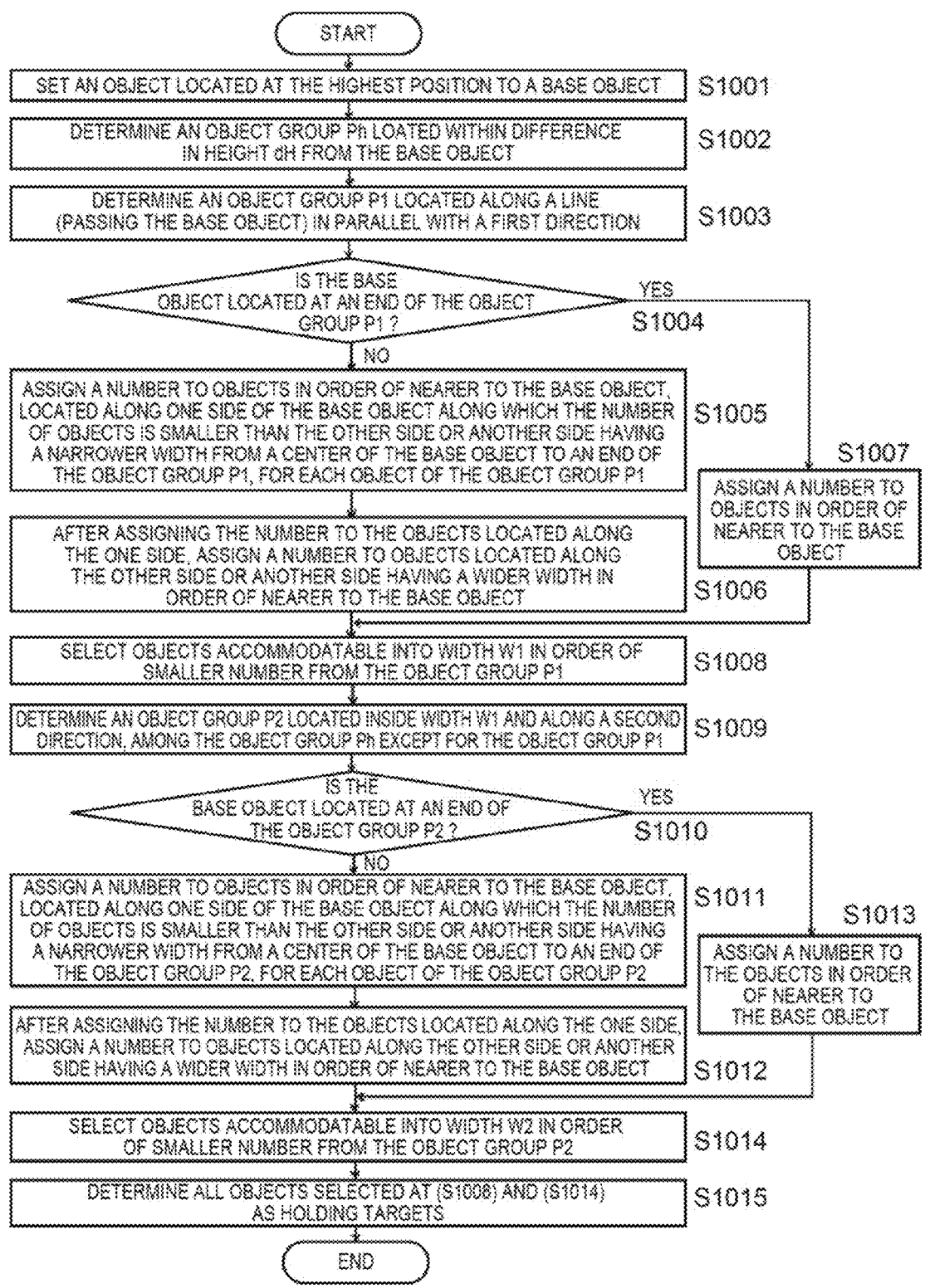
FIG. 10 is a flow chart of processing in case that objects are loaded in a planar status.

FIG. 10 is a flow chart of processing of the controller in case that objects are loaded in a planar status. First, a base object located at the highest position is determined (S1001). Next, an object group Ph located within a difference in height dH from the base object is determined (S1002). Among the object group Ph, an object group P1 located along a line passing the base object and in parallel with the first direction is detected (S1003). It is confirmed whether the base object is located at an end (end part) of the object group P1 (S1004). In case of "No", as to each object included in the object group P1, among objects located at one side of the base object along which the number of objects aligned with the base object is smaller, or among objects located at one side of the base object along which an width from a center of the base object to an end of the object group P1 is narrower, the objects are numbered in order to nearer to the base object (S1005). After completing numbering of the objects located at one side of the base object along which the number of objects aligned with the base object is smaller, among objects located at another side of the base object along which the number of objects aligned with the base object is larger, the objects are numbered in order to nearer to the base object. Alternatively, after completing numbering of objects located at one side of the base object along which an width from a center of the base object to an end of the object group P1 is narrower, among objects located at another side of the base object along which an width from a center of the base object to an end of the object group P1 is wider, the objects are numbered in order to nearer to the base object (S1006). In case of "Yes", each object of the object group P1 is numbered in order of nearer to the base object (S1007). Among the object group P1, objects accommodated into a width W1 of the transportation region are selected in order of smaller number (S1008).

Among the object group Ph except for the object group P1, an object group P2 located inside the width W1 and along the second direction are determined (S1009). It is confirmed whether the base object is located at an end of the object group P2 (S1010). In case of "No", as to each object included in the object group P2, among objects located at one side of the base object along which the number of objects aligned with the base object is smaller, or among objects located at one side of the base object along which an width from a center of the base object to an end of the object group P2 is narrower, the objects are numbered in order to nearer to the base object (S1011). After completing numbering of the objects located at one side of the base object along which the number of objects aligned with the base object is smaller, among objects located at another side of the base object along which the number of objects aligned with the base object is larger, the objects are numbered in order to nearer to the base object. Alternatively, after completing numbering of objects located at one side of the base object along which an width from a center of the base object to an end of the object group P2 is narrower, among objects located at another side of the base object along which an width from a center of the base object to an end of the object group P2 is wider, the objects are numbered in order to nearer to the base object (S1012). In case of "Yes", each object of the object group P2 is numbered in order of nearer to the base object (S1013). Among the object group P2, objects accommodated into a width 12 of the transportation region are selected in order of smaller number (S1014). All objects selected at (S1008) and (S1014) are determined as holding targets (S1015). The objects (holding targets) are held by the holding part and transferred to the transportation region. In above-mentioned flow chart of the controller in case that objects are loaded in a planer shape, a method for setting the number of objects around the base object to a reference is called "a third method". Furthermore, a method for setting a clearance of a position of the base object from a center of the loading region (a width from a center of the base object to an end of the loading region) to a reference is called "a fourth method".

By extending a range of the holding target to two-dimensional plane, a plurality of objects can be effectively held and transported. An area of the transportation region is supposed as a quadrangle such as a square or a rectangle. However, the area of the transportation region is not limited to the quadrangle, and may be a circle and a polygon. The flow chart of FIG. 10 can be applied to them.

In the object holding apparatus of the first embodiment, as to a plurality of objects loaded into the loading region, the flow chart of FIG. 7, FIG. 8 or FIG. 10 is repeatedly applied thereto until no objects exist in the loading region.

FIGS. 11A~11F are schematic diagrams of one example of processing in case of repeatedly applying the first method to objects loaded randomly. Here, in order to simplify, the case that objects are aligned along a single line is explained.

In FIGS. 11A~11F, a width of the transportation region is W, a width of the holding part is Wh, and a simultaneously holdable difference in height is dH.

According to processing of the first method, as shown in steps of FIG. 1A, by setting an object located at the highest position to a base object, four objects located within a height dH from the base object are selected. The base object is numbered as "1". Objects aligned at one side of the base object (along which the number of objects is smaller than the number of objects aligned at the other side of the base object) are numbered. The number of objects accommodatable into a width W of the transportation region is selected in order of smaller number. In case of rig. 1A, objects 1~3 are holding transportation targets.

Figure 11A:
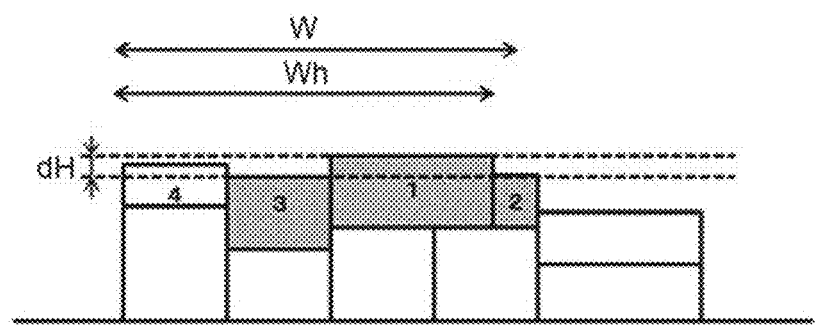
FIGS. 11A~11F are schematic diagrams of one example of processing in case of repeatedly applying the first method to objects loaded randomly.
Figure 11B:
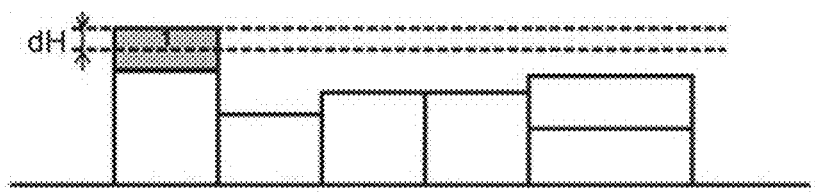

Next, as to other objects except for the objects 1~3 (transported in FIG. 1A), the same processing is performed. As shown in FIG. 11B, by setting an object located at the highest position to a base object, objects located within a height dH from the base object are selected. In case of FIG. 11B, only the base object is a holding transportation target.

Figure 11C:
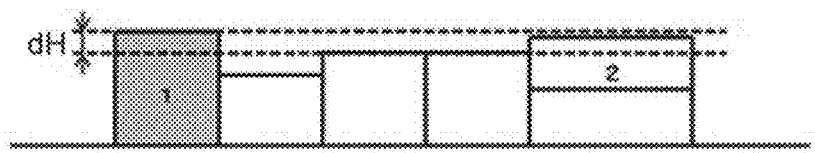
Figure 11D:
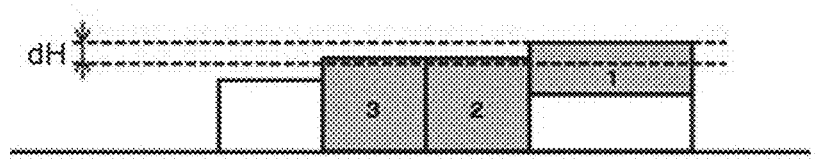

Next, as to other objects except for the object 1 (transported in FIG. 1B), the same processing is performed. As shown in FIG. 11C, by setting an object located at the highest position to a base object, two objects located within a height dH from the base object are selected. In case of FIG. 11C, an object 2 is located at a position over a width W of the transportation region from the base object. Accordingly, the object 2 is not a transportation object. Only the base object is a holding transportation target.

Figure 11E:
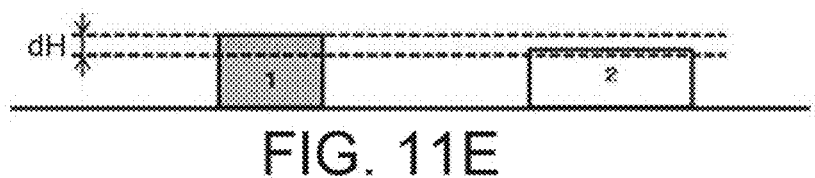
Figure 11F:
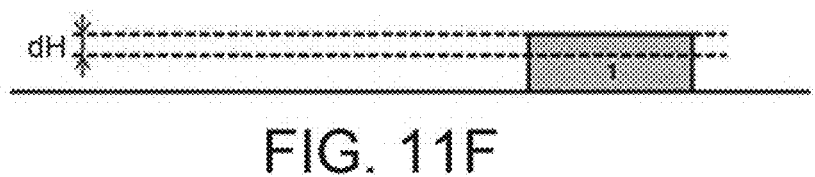

Next, as to other objects except for the object 1 (transported in FIG. 1C), the same processing is performed. As shown in FIG. 1D, by setting an object located at the highest position to a base object, three objects located within a height dH from the base object are selected. The base object is numbered as "1". Objects aligned at one side of the base object (along which the number of objects is smaller than the number of objects aligned at the other side of the base object) are numbered. In case of FIG. 1D, no objects aligned at the right side of the base object. Accordingly, objects aligned at the left side of the base object are numbered. By selecting the number of objects accommodatable into a width W of the transportation region, three objects 1~3 are holding transportation targets. By processing other objects except for three objects 1~3 (transported in FIG. 11D) in the same way, as shown in FIGS. 11E and 11F, processing is completed in total six times. On the other hand, if objects are simply processed from the right side, processing in total seven times is necessary.

Figures 12, 13:
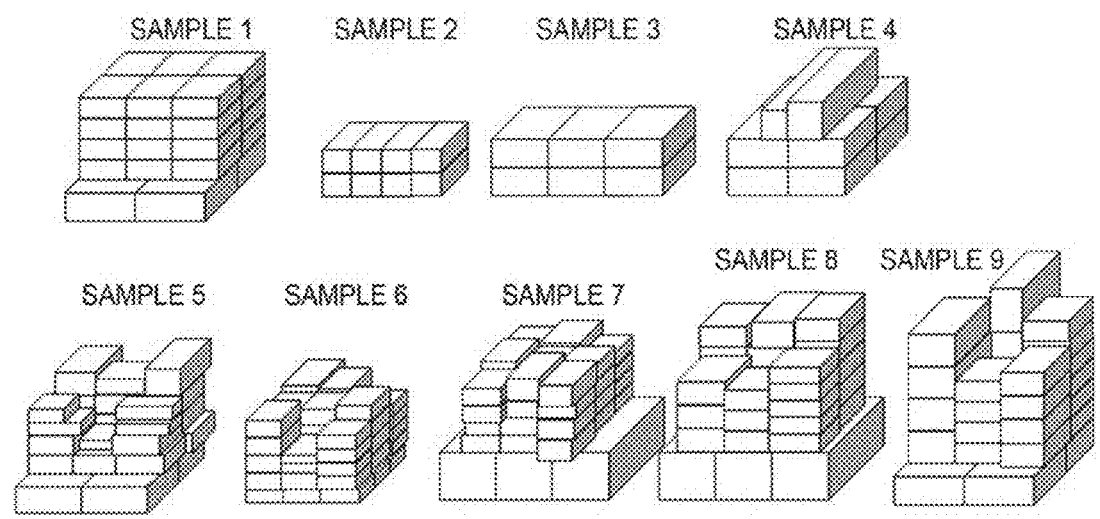
FIG. 12 is a table showing simulation results in case of processing by the third method and the conventional method.
FIG. 13 is a schematic diagram showing a shape of loaded objects used for the simulation.

FIG. 12 is a comparison table showing simulation results of the number of holding objects in case of processing by algorithm of the controller of the first embodiment and in case of processing by conventional steps.

As shown in FIG. 13, as loaded objects used for the simulation, samples 1~4 (having similar size and shape) loaded with alignment, and samples 5~9 (having different size and shape) loaded randomly, are used.

Furthermore, as a processing method used for the simulation, following five methods are used.

Conventional method 1 (foldable objects are held and transported in order from the right side of loaded objects)

Conventional method 2 (foldable objects are held and transported in order from the left side of loaded objects in order)

Conventional method 3 (Objects aligned at one side of a central object of loaded objects along which the number of objects is smaller than the other side of the central object are held and transported in order)

Conventional method 4 (Objects aligned at one side of a central object of loaded objects along which the number of objects is larger than the other side of the central object are held and transported in order)

The third method of the first embodiment (The flow chart of FIG. 10)

Values outputted by the simulation are values that the number of processed objects is divided by the number of times of holding operation. Namely, it is the number of objects held by one time holding operation.

As shown in FIG. 12, the third method represents the most excellent result. Especially, as to samples 5~9 (holding of objects loaded randomly), in comparison with the conventional methods, the third method represents profitable results. In FIG. 12, the comparison is performed using the third method. However, even if the fourth method is selected, similar results are acquired.

By using the object holding apparatus of the first embodiment, in comparison with conventional technique, effective transportation of objects becomes possible. As a result, a time to transport a plurality of objects can be reduced.

Furthermore, the controller of the first embodiment is composed by a simple algorithm. Accordingly, calculation time can be shortened, and the processing efficiency can be improved.

Furthermore, information such as a size and a shape of objects, and a loading status of the objects, need not be previously registered. Accordingly, the working efficiency can be improved.

The Second Embodiment

The second embodiment is explained by referring to FIGS. 14~20. In the second embodiment, exceptional items of holding transportation processing of the controller of the first embodiment are explained. As to components except for the items are same as the object holding apparatus of the first embodiment.

Figure 14:
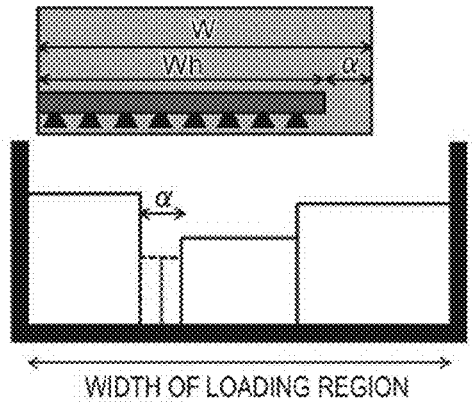
FIG. 14 is a schematic diagram showing one example in case that a width of a holding part is larger than a half of the loading region and a holding target object is equal to the width of the holding part.
Figure 15:
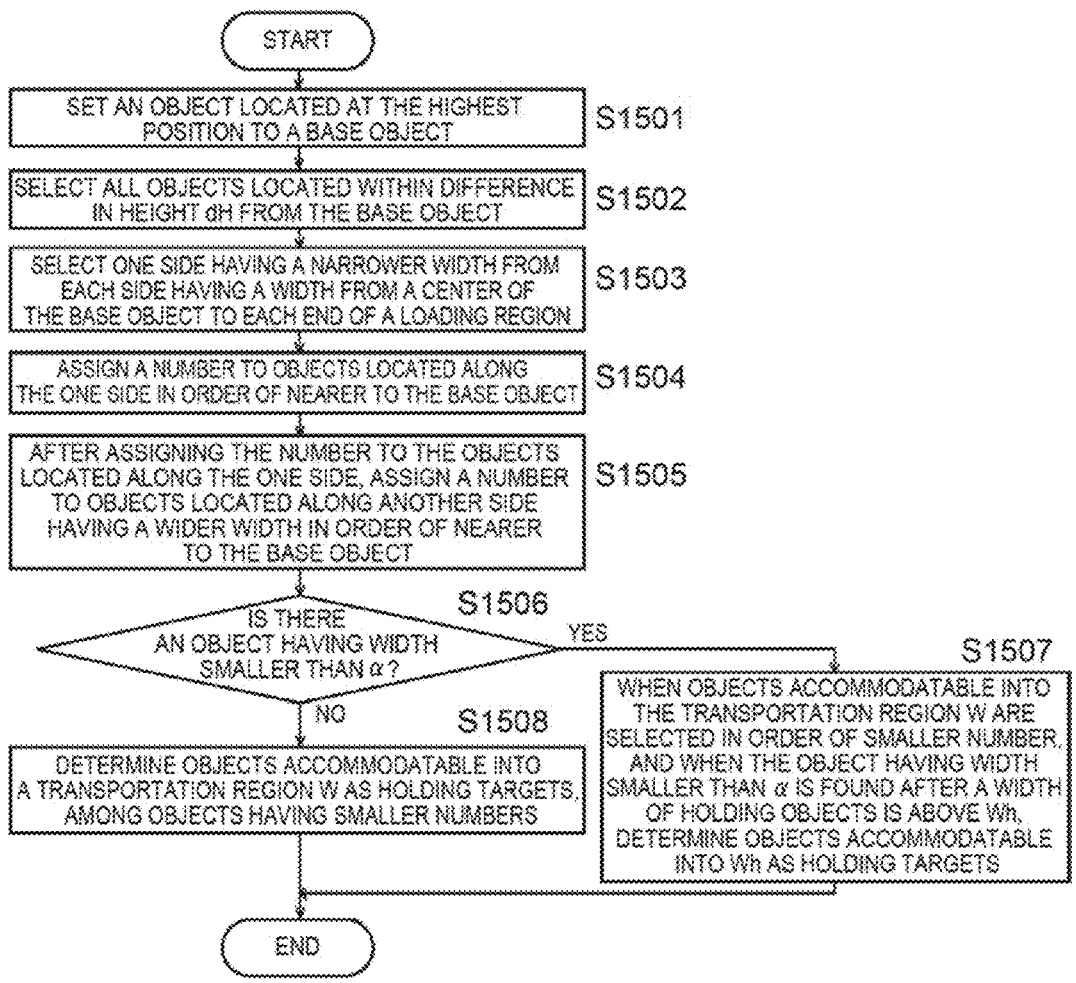
FIG. 15 is a flow chart of processing in case that a width of a holding part is larger than a half of the loading region and a holding target object is equal to the width of the holding part.

FIG. 14 is a schematic diagram showing one example in case that a width of the holding part is larger than a half of the loading region and a width of holding target objects is equal to the width of the holding part. A width of the transportation region is a value that a is added to a width of the holding part. In this case, in the holding transportation method (the first~fourth methods) of the first embodiment, additional steps are preferably set.

As shown in FIG. 14, when at least one object having a width smaller than α exists in the loading region, if a width of holding target objects is equal to a width of the holding part, and if an object to be selected last is the object having a width smaller than α, this object cannot be often transported. Accordingly, this object is excluded from the holding target objects. Namely, in order to transport objects having a width equal to a width of the holding part, these objects can be transported only one time by one holding operation. Accordingly, the object having a width smaller than α should not be held with other objects simultaneously.

On the other side, if an object having a width smaller than α exists in the loaded region, the first~fourth methods of the first embodiment can be applied.

By using FIG. 5, concrete processing flow of this case is explained.

First, an object located at the highest position is set to a base object (S1501). All objects located within a difference in height dH from the base object are selected (S1502). Among respective widths from a center of the base object to each end (each end part) of the loading region, one side (of the base object) having a narrower width is selected (S1503). As to objects aligned at the one side having the narrower width, the objects are numbered in order of nearer to the base object (S1504). After completing numbering of the objects, as to objects aligned at another side (of the base object) having a wider width, the objects are numbered in order of nearer to the base object (S1505). Next, the processing flow is branched by whether an object having a width smaller than α is included in numbered objects (S1506). If the object having a width smaller than α is included (Yes at S1506), when objects accommodatable into a width W of the transportation region are selected in order of smaller number, and when an object having a width smaller than α is found (selected) after a width of selected objects (holding targets) is over Wh (width of the holding part), objects accommodatable into Nh are set to holding targets (S1507). If the object having a width smaller than α is not included (No at S1506), among objects having smaller numbers, objects accommodatable into W (width of the transportation region) are set to holding targets (S1508).

Figure 16:
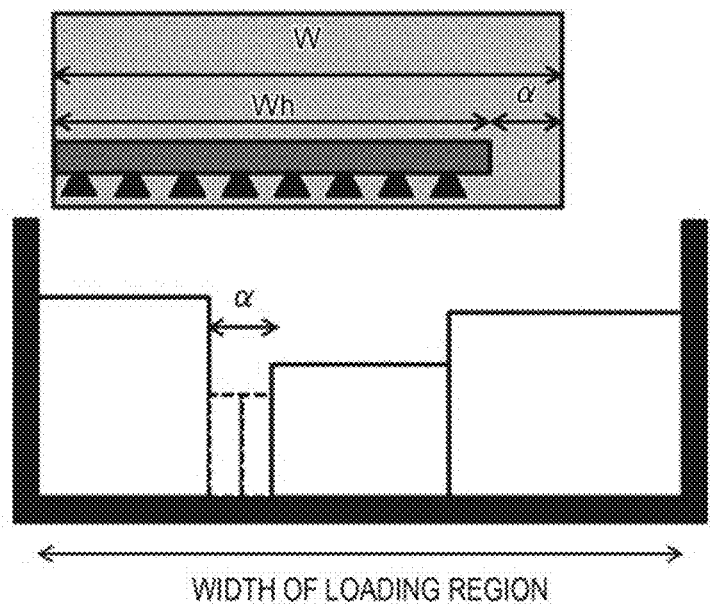
FIG. 16 is a schematic diagram showing one example in case that a width of a holding part is larger than a half of the loading region and respective widths of holding target objects are not equal to the width of the holding part.

FIG. 16 is a schematic diagram showing one example in case that a width of the holding part is larger than a half of the loading region and respective widths of holding target objects are not equal to the width of the holding part. A width W of the transportation region is a value that a is added to a width Wh of the holding part.

As shown in FIG. 16, if an object having a width smaller than α exists in the loading region, when the object having a width smaller than α is found (selected) after a width of simultaneously holdable objects (holding targets) is over Wh (width of the holding part), the object having a width smaller than α is excluded from the simultaneously holdable objects.

On the other side, if an object having a width smaller than α does not exist in the loaded region, the first~fourth methods of the first embodiment can be applied. The processing flow is same as that of FIG. 15.

Figure 17:
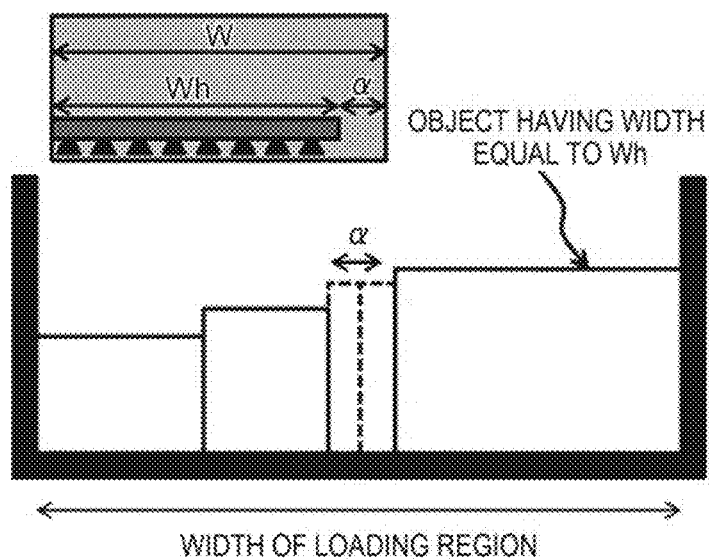
FIG. 17 is a schematic diagram showing one example in case that a width of a holding part is smaller than a half of the loading region and any target object is equal to the width of the holding part.

FIG. 17 is a schematic diagram showing one example in case that a width of a holding part is smaller than a half of the loading region and a width of at least one holding target object is equal to the width of the holding part. A width W of the transportation region is a value that a is added to a width Wh of the holding part.

As shown in FIG. 17, if an object having a width smaller than α exists in the loading region, when the object having a width smaller than α is found (selected) after a width of simultaneously holdable objects (already selected) is over Wh (width of the holding part), the object having a width smaller than α is excluded from the simultaneously holdable objects. Furthermore, when objects are selected based on numbers assigned to the objects in order of smaller number, at timing when a large object having a width equal to a width Wh of the holding part is selected, this object is excluded from the holding targets. In this case, a selection direction is inverted, or this selection is completed. As a result, it is avoided that a large object (having a width equal to a width of the holding part) and another object are set to holding targets simultaneously.

On the other hand, if the object having a width smaller than α does not exist in the loading region, when objects are selected based on numbers assigned to the objects in order of smaller number, at timing when a large object having a width equal to a width Wh of the holding part is selected, this object is excluded from the holding targets. In this case, a selection direction is inverted, or this selection is completed. As a result, it is avoided that a large object (having a width equal to a width of the holding part) and another object are set to holding targets simultaneously.

Figure 18:
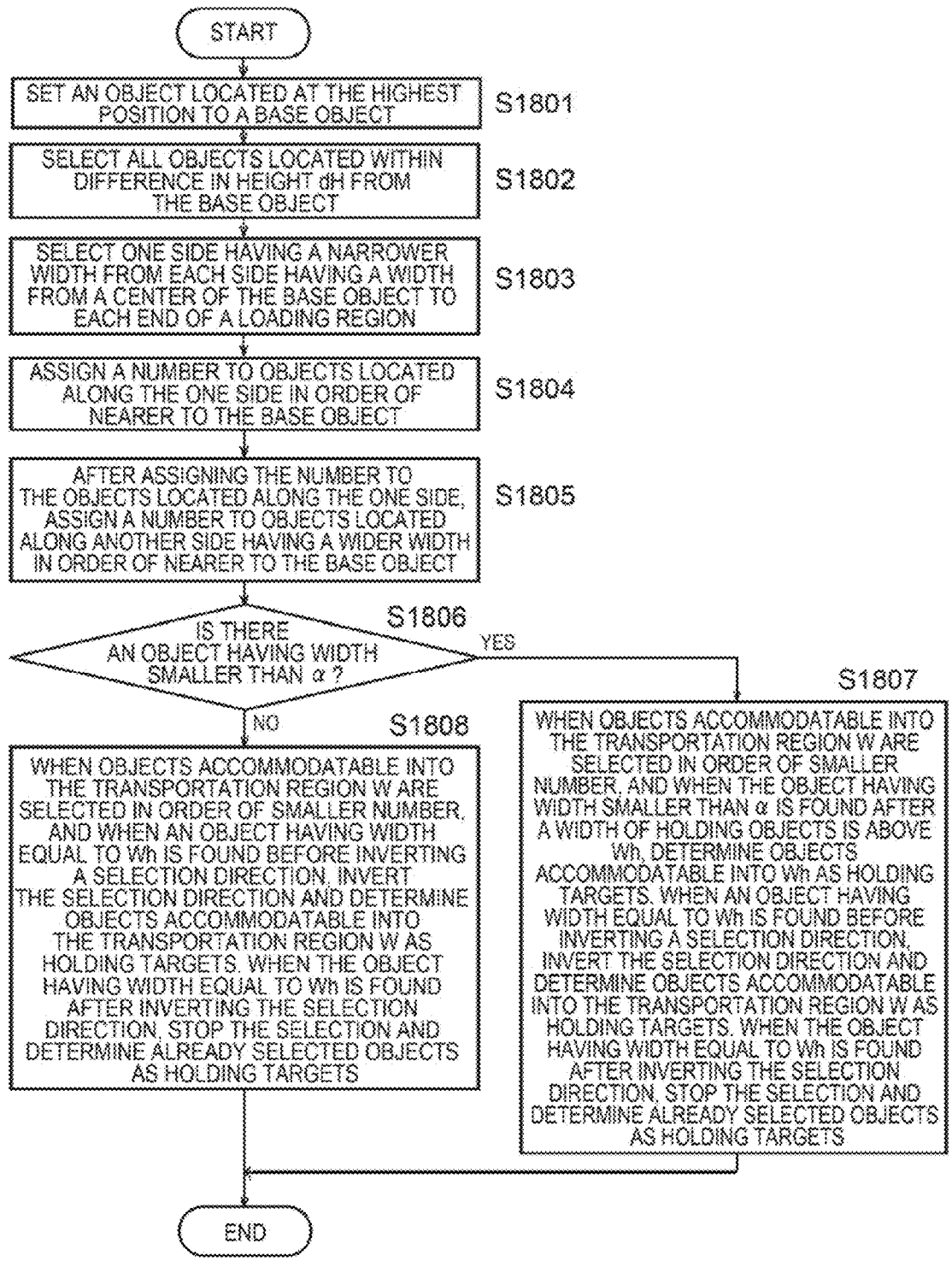
FIG. 18 is a flow chart of processing in case that a width of a holding part is smaller than a half of the loading region and any target object is equal to the width of the holding part.

FIG. 18 is a flow chart of processing of this case. In FIG. 18, steps of S1801~S1806 are same as S1501~S1506 of FIG. 15. Accordingly, explanation thereof is omitted.

If an object having a width smaller than α exists in the loading region, when objects accommodatable into W (width of the transportation part) are selected in order of smaller number, and when an object having a width smaller than α is found (selected) after a width of holding objects (selected objects) is over Wh, objects accommodatable into Wh are set to holding targets. Furthermore, when an object having a width equal to Wh (width of the holding part) is found (selected) before inverting a selection direction, the selection direction is inverted, and objects accommodatable into N (width of the transportation region) are set to holding targets. When the object having a width equal to Wh (width of the holding part) is found (selected) after inverting the selection direction, this selection is completed, and objects selected till then are set to holding targets (S1807).

If the object having a width smaller than α does not exist in the loading region, when objects accommodatable into N (width of the transportation part) are selected in order of smaller number, and when an object having a width equal to Wh (width of the holding part) is found (selected) before inverting the selection direction, the selection direction is inverted, and objects accommodatable into W (width of the transportation region) are set to holding targets. When the object having a width equal to Wh (width of the holding part) is found (selected) after inverting the selection direction, this selection is completed, and objects selected till then are set to holding targets (S1808).

Figure 19:
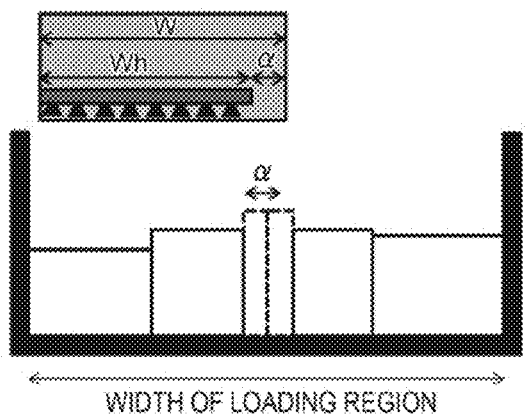
FIG. 19 is a schematic diagram showing one example in case that a width of a holding part is smaller than a half of the loading region and respective widths of holding target objects are not equal to the width of the holding part.

FIG. 19 is a schematic diagram showing one example in case that a width of the holding part is smaller than a half of the loading region and respective widths of target objects are not equal to the width of the holding part. A width W of the transportation region is a value that a is added to a width Wh of the holding part.

As shown in FIG. 19, if an object having a width smaller than α exists in the loading region, when the object having a width smaller than α is found (selected) after a width of simultaneously holdable objects (already selected) is over Wh (width of the holding part), the object having a width smaller than α is excluded from the simultaneously holdable objects.

On the other side, if the object having a width smaller than α does not exist in the loaded region, the first~fourth methods of the first embodiment can be applied.

Figure 20:
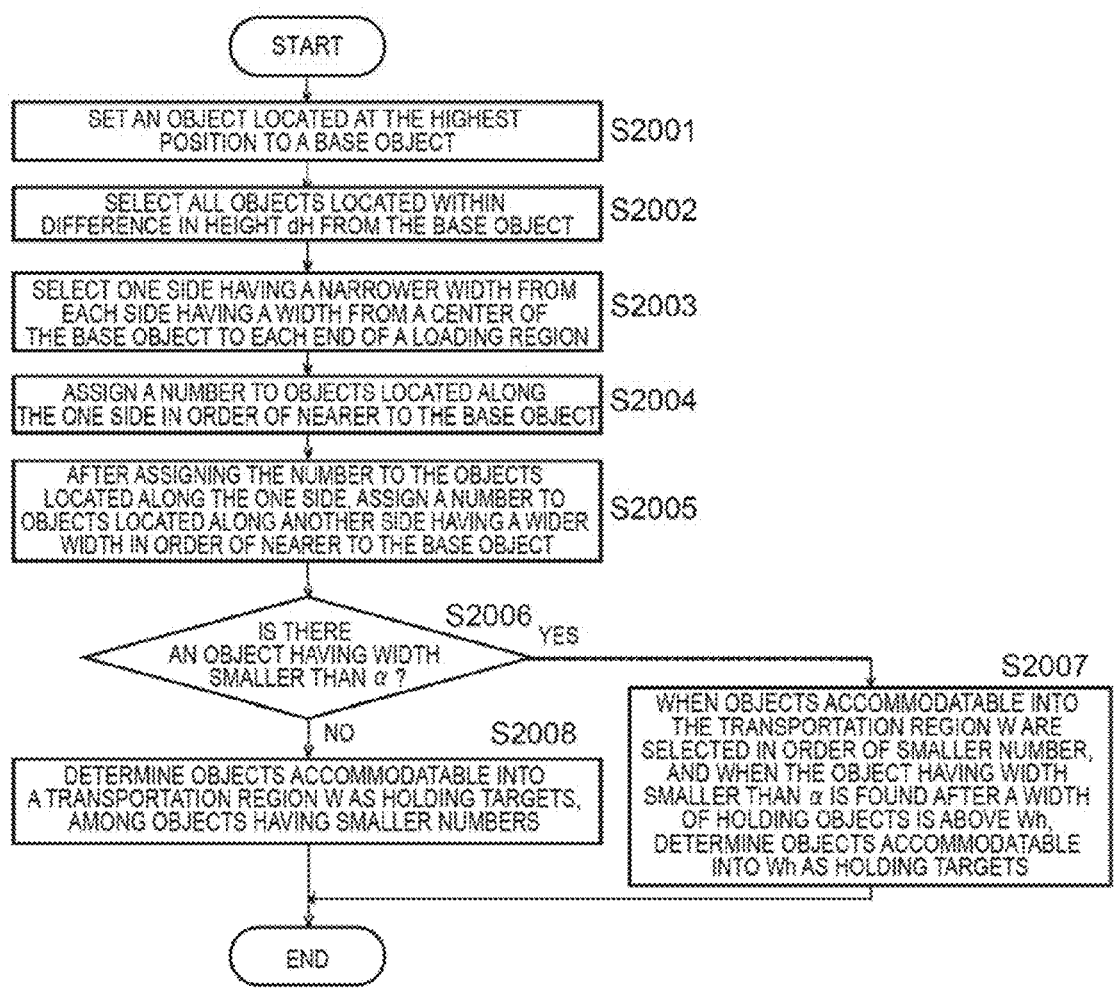
FIG. 20 is a flow chart of processing in case that a width of a holding part is smaller than a half of the loading region and respective widths of holding target objects are not equal to the width of the holding part.

FIG. 20 is a flow chart of processing of this case. In FIG. 20, steps of S2001~S2006 are same as S1501~S1506 of FIG. 15. Accordingly, explanation thereof is omitted.

If an object having a width smaller than α exists in the loading region, when objects accommodatable into W (width of the transportation part) are selected in order of smaller number, and when an object having a width smaller than α is found (selected) after a width of holding objects (selected objects) is over Wh, objects accommodatable into Wh are set to holding targets (S2007).

If the object having a width smaller than α does not exist in the loading region, among object having smaller numbers, objects accommodatable into W (width of the transportation region) are set to holding targets (S2008).

In explanation of FIGS. 14~20, the object located at the highest position is set to the base object, and this processing was explained using the second method. However, based on the status, the first method may be used arbitrarily.

By adding above-mentioned method to the holding transportation processing of the object holding apparatus of the first embodiment, the case that the holding part cannot hold objects is avoided, and more effective holding transportation becomes possible.

Moreover, in the first and second embodiments, the driving part to drive along three axes directions (xyz directions) was explained. However, driving operation of the driving part is not to this. By equipping a plurality of joints, the driving part may have a shape of multiple joints rotating around a central axis of each joint. Furthermore, the driving part may have component that multiple joints driving and orthogonal driving are combined. In consideration of a cost, an environment of a transportation spot, and so on, the driving part can be selected arbitrarily.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An object holding apparatus comprising:
   a holding part that is able to hold at least one object;
   a recognition device that recognizes a plurality of objects to generate a recognition result; and
   a controller that
      selects a first object from the objects, based on the recognition result,
      sets a first direction to one side of the first object along which the number of objects aligned with the first object is smaller than the number of objects aligned with the first object along the other side of the first object,
      selects a second object aligned with the first object along the first direction, and
      controls a driving of the holding part, based on a selection result of the first object and the second object.

2. The object holding apparatus according to claim 1, wherein the controller sets an object located at the highest position among the plurality of objects based on the recognition result, to the first object.

3. The object holding apparatus according to claim 1, wherein,
if the first object is located at an end of the plurality of objects,
the controller sets an object adjacent to the first object among the plurality of objects, to the second object.

4. The object holding apparatus according to claim 1, wherein
the recognition device generates the recognition result as objects holdable by the holding part simultaneously.

5. The object holding apparatus according to claim 1, wherein
the recognition device generates the recognition result as an image representing locations of the plurality of objects.

6. The object holding apparatus according to claim 5, wherein
the controller
detects a first edge formed by a front face and a top face of the first object, and a second edge formed by a front face and a top face of a second object located at a lower position than the first object among the plurality of objects, and
calculates a difference in height between the first edge and the second edge.

7. The object holding apparatus according to claim 1, wherein
the holding part equips a suction pad to suck the at least one object.

8. The object holding apparatus according to claim 1, wherein
the controller
sets a second direction intersecting with the first direction, based on the first object,
selects a third object located along the second direction from the plurality of objects, and
controls the driving of the holding part, based on a selection result of the third object.

9. The object holding apparatus according to claim 1, wherein
the controller
assigns a number to respective objects located along the first direction in order to nearer to the first object, and
determines objects accommodatable into a transportation region among the respective objects in order of smaller number, as holding targets by the holding part.

10. An object holding apparatus comprising:
a holding part that is able to hold at least one object;
a recognition device that recognizes a plurality of objects to generate a recognition result; and
a controller that
selects a first object from the objects, based on the recognition result,
sets a first direction to one side of the first object along which a distance from the first object to an end of objects aligned with the first object is smaller than a distance from the first object to an end of objects aligned with the first object along the other side of the first object,
selects a second object aligned with the first object along the first direction, and
controls a driving of the holding part, based on a selection result of the first object and the second object.

11. The object holding apparatus according to claim 10, wherein
the controller sets an object located at the highest position among the plurality of objects based on the recognition result, to the first object.

12. The object holding apparatus according to claim 10, wherein,
if the first object is located at an end of the plurality of objects,
the controller sets an object adjacent to the first object among the plurality of objects, to the second object.

13. The object holding apparatus according to claim 10, wherein
the recognition device generates the recognition result representing objects holdable by the holding part simultaneously.

14. The object holding apparatus according to claim 10, wherein
the recognition device generates the recognition result as an image representing locations of the plurality of objects.

15. The object holding apparatus according to claim 14, wherein
the controller
detects a first edge formed by a front face and a top face of the first object, and a second edge formed by a front face and a top face of a second object located at a lower position than the first object among the plurality of objects, and
calculates a difference in height between the first edge and the second edge.

16. The object holding apparatus according to claim 10, wherein
the holding part equips a suction pad to suck the at least one object.

17. The object holding apparatus according to claim 10, wherein
the controller
sets a second direction intersecting with the first direction, based on the first object,
selects a third object located along the second direction from the plurality of objects, and
controls the driving of the holding part, based on a selection result of the third object.

18. The object holding apparatus according to claim 10, wherein
the controller
assigns a number to respective objects located along the first direction in order to nearer to the first object, and
determines objects accommodatable into a transportation region among the respective objects in order of smaller number, as holding targets by the holding part.

19. An object holding method in an apparatus including a holding part that is able to hold at least one object, a recognition device that recognizes a plurality of objects, and a controller that controls a driving of the holding part,
the method comprising:
generating by the recognition device, a recognition result of the plurality of objects;
selecting by the controller, a first object from the objects, based on the recognition result;
setting by the controller, a first direction to one side of the first object along which the number of objects aligned with the first object is smaller than the number of objects aligned with the first object along the other side of the first object;

selecting by the controller, a second object aligned with the first object along the first direction; and controlling by the controller, a driving of the holding part, based on a selection result of the first object and the second object.

20. An object holding method in an apparatus including a holding part that is able to hold at least one object, a recognition device that recognizes a plurality of objects, and a controller that controls a driving of the holding part, the method comprising:

generating by the recognition device, a recognition result of the plurality of objects;

selecting by the controller, a first object from the objects, based on the recognition result;

setting by the controller, a first direction to one side of the first object along which a distance from the first object to an end of objects aligned with the first object is smaller than a distance from the first object to an end of objects aligned with the first object along the other side of the first object;

selecting by the controller, a second object aligned with the first object along the first direction; and controlling by the controller, a driving of the holding part, based on a selection result of the first object and the second object.

\* \* \* \* \*